United States Patent [19]

Wall

[11] Patent Number: 5,361,622
[45] Date of Patent: Nov. 8, 1994

[54] DEVICE AND METHOD FOR DETECTION OF LEAKS IN PRESSURIZED FLUID VESSELS

[75] Inventor: John T. Wall, Seven Hills, Ohio

[73] Assignee: The Shafer Valve Company, Mansfield, Ohio

[21] Appl. No.: 118,181

[22] Filed: Sep. 9, 1993

[51] Int. Cl.⁵ .......................... G01M 3/00; G01F 15/00
[52] U.S. Cl. ........................................ 73/49.2; 73/49.1
[58] Field of Search ............... 73/40.5 R, 49.1, 49.2 R

[56] References Cited

U.S. PATENT DOCUMENTS

| | | | |
|---|---|---|---|
| 3,664,357 | 5/1972 | Kreiss | 137/2 |
| 3,884,077 | 5/1975 | Athy, Jr. | 73/388 R |
| 3,903,729 | 9/1975 | Covington | 73/40.5 R |
| 4,012,944 | 3/1977 | Covington et al. | 73/40.5 R |
| 4,608,857 | 9/1986 | Mertens et al. | 73/49.1 |
| 4,625,545 | 12/1986 | Holm et al. | 73/40 |
| 4,796,466 | 1/1989 | Farmer | 73/49.1 |
| 4,835,717 | 5/1989 | Michel et al. | 73/40.5 R |
| 4,837,707 | 6/1989 | Giometti et al. | 73/49.2 R |
| 5,272,646 | 12/1993 | Farmer | 73/40.5 R |

Primary Examiner—Thomas P. Noland
Assistant Examiner—J. David Wiggins
Attorney, Agent, or Firm—Renner, Kenner, Greive, Bobak, Taylor & Weber

[57] ABSTRACT

A device (10) for detecting irregular operation in a pressurized fluid vessel, such as leaks in a pipeline (20), includes a transducer (21) for measuring pipeline (20) instantaneous pressure, a microcomputer (23) and a wake-up timer (29). Microcomputer (23) performs several different tests upon the collected pressure data to reliably ascertain if a leak or break in pipeline (20) has occurred. The first test involves a comparison of rates of change of pressure at successive preselected timed intervals, referred to as timed interval comparisons. If any test is failed, an alarm (30) and/or actuator (31) for valve or system shut-down are operated. Once the timed intervals and testing are concluded, microprocessor (23) reverts to a powerdown mode to conserve power. Wake-up timer (29) resets microcomputer (23) at preselected intervals for additional pressure data collection and testing.

10 Claims, 2 Drawing Sheets

DEVICE AND METHOD FOR DETECTION OF LEAKS IN PRESSURIZED FLUID VESSELS

TECHNICAL FIELD

The present invention relates generally to a device and method for detecting irregular operation in pressurized fluid vessels carrying liquid or gaseous materials. More particularly, the invention relates to electronic instrumentation and methods of operation for detecting leaks in a pipeline. Still more specifically, the present invention relates to electronic pipeline leak detectors in which instantaneous pressure magnitudes are monitored, and values such as average rate of change of pressure and maximum change of pressure are calculated and compared with preselected values, providing an indication of potential leaks or breaks in the pipeline so that an alarm annunciation or action can be taken, if necessary or desired.

BACKGROUND ART

Leaks or breaks in a vessel, such as a pipeline, that can be transporting a fluid or gaseous material over long distances, must be detected in order to avoid loss of the material, and, in many cases, for safety and environmental considerations. Moreover, many such pipeline vessels are located in outlying areas with no on-site attendant, and therefore a reliable device and method for remote detection is necessary and desirable.

If, on the other hand, such devices and methods indicate erroneously that a leak or break has occurred, a false alarm is sounded. False alarms can be expensive to the pipeline operator, as they could cause false shut-downs of the pipeline and/or unnecessary repair trips by maintenance personnel. Therefore, while it is desirable to provide a device and method that is sensitive to detection of those vessel characteristics whose magnitude change upon the occurrence of a leak or break (such as pressure, flow and temperature), care must be taken to preclude false detection possibilities.

Currently available leak detection devices, such as the pressure based sensing device disclosed in U.S. Pat. No. 4,012,944, can be sensitive enough to detect most unacceptable operational conditions, but they do not have an accurate method of determining if the unacceptable condition results from something other than a leak or break, and therefore the potential for false alarms exists. Devices as this measure pressure and calculate both rate of pressure change and total pressure change, and from these measurements determine if a leak or break has occurred.

Moreover, most commercially available devices for detection of pipeline leaks or breaks are at least in part mechanical in nature, often giving rise to such problems as a lack of sufficient sensitivity, and greater susceptibility to corrosion, condensation and blockage.

Comparison of rates of change at successive preselected timed intervals has been found to greatly facilitate recognition of instances of false triggering and the avoidance of false alarms without the sacrifice of sufficient sensitivity to detect substantially all leaks and breaks, particularly when utilized in conjunction with known leak and break detection techniques. Also, this method of operation may be implemented wholly electronically, avoiding the difficulties that may plague devices with mechanical components, and using any desired characteristic, of course including the most common characteristic of pressure.

SUMMARY OF THE INVENTION

It is, therefore, an object of the present invention to provide a device and method for detecting leaks or breaks in pressurized fluid vessels, such as a pipeline, which minimizes or eliminates false alarms.

It is another object of the present invention to provide a device and method, as set forth above, that measures a characteristic that changes upon the occurrence of a break or leak, determines the rate of change of such characteristic at preselected times, and compares the rates of change at successive preselected timed intervals.

It is yet another object of the present invention to provide a device and method, as set forth above, that also determines the total change, and minimum and maximum magnitudes of such characteristic in the vessel over a preselected period of time.

It is still another object of the present invention to provide a device and method, as set forth above, that may be implemented electronically so as to enhance sensitivity and minimize or eliminate susceptibility to corrosion, condensation and blockage.

It is a further object of the present invention to provide a device and method, as set forth above, that utilizes pressure as the characteristic from which determinations as to leaks or breaks is made.

It is yet a further object of the present invention to provide a device and method, as above, in which the fluid present can be either gaseous or liquid in nature.

It is still another object of the present invention to provide a device and method, as set forth above, that can be utilized in a similar manner with other fluid characteristics in addition to pressure, such as flow or temperature.

These and other objects and advantages of the present invention over existing prior art forms will become more apparent and fully understood from the following description in conjunction with the accompanying drawings.

In general, a device for monitoring and detecting irregularities in a preselected characteristic of a fluid in a vessel includes transducer means for monitoring the preselected characteristic of the fluid in the vessel and providing an analog transducer output signal proportional thereto, converter means for receiving the analog transducer output signal, sampling the analog transducer output signal at preselected measurement time intervals within a preselected study time interval, and providing a digital output signal proportional to the analog transducer output signal at each preselected measurement time interval, and a processor means. The processor means receives the digital output signal for each preselected measurement time interval, calculates a plurality of changes in the preselected characteristic for a like plurality of preselected measurement time intervals, calculates a total change in the preselected characteristic over the preselected study time interval, compares the plurality of changes in the preselected characteristic to a preselected maximum rate of change in the preselected characteristic, compares the total change in the preselected characteristic over the preselected study time interval to a preselected maximum total change in the preselected characteristic, and generates an alarm output signal when a preselected plurality of the plurality of changes in the preselected characteristic exceed the preselected maximum rate of change in the preselected characteristic and the total change in the preselected characteristic over the preselected study time interval exceeds the preselected maximum total change in the preselected characteristic for longer than a first preselected period of time. An alarm receives the alarm output signal and annunciates the existence of an irregularity in the preselected characteristic.

In general, a method for monitoring and detecting irregularities in a preselected characteristic of a fluid in a vessel includes the steps of monitoring the preselected characteristic of the fluid in the vessel and providing an analog transducer output signal proportional thereto, sampling the analog transducer output signal at preselected measurement time intervals within a preselected study time interval and providing a digital output signal proportional to the analog transducer output signal at each preselected measurement time interval, calculating a plurality of changes in the preselected characteristic for a like plurality of the preselected measurement time intervals, calculating a total change in the preselected characteristic over the preselected study time interval, comparing the plurality of changes in the preselected characteristic to a preselected maximum rate of change in the preselected characteristic, comparing the total change in the preselected characteristic over the preselected study time interval to a preselected maximum total change in the preselected characteristic, generating an alarm output signal when a preselected plurality of the plurality of changes in the preselected characteristic exceed the preselected maximum rate of change in the preselected characteristic and the total change in the preselected characteristic over the preselected study time interval exceeds the preselected maximum total change in the preselected characteristic for longer than a first preselected period of time, and, annunciating the existence of an irregularity in the preselected characteristic.

PREFERRED EMBODIMENT FOR CARRYING OUT THE INVENTION

Figure 1:
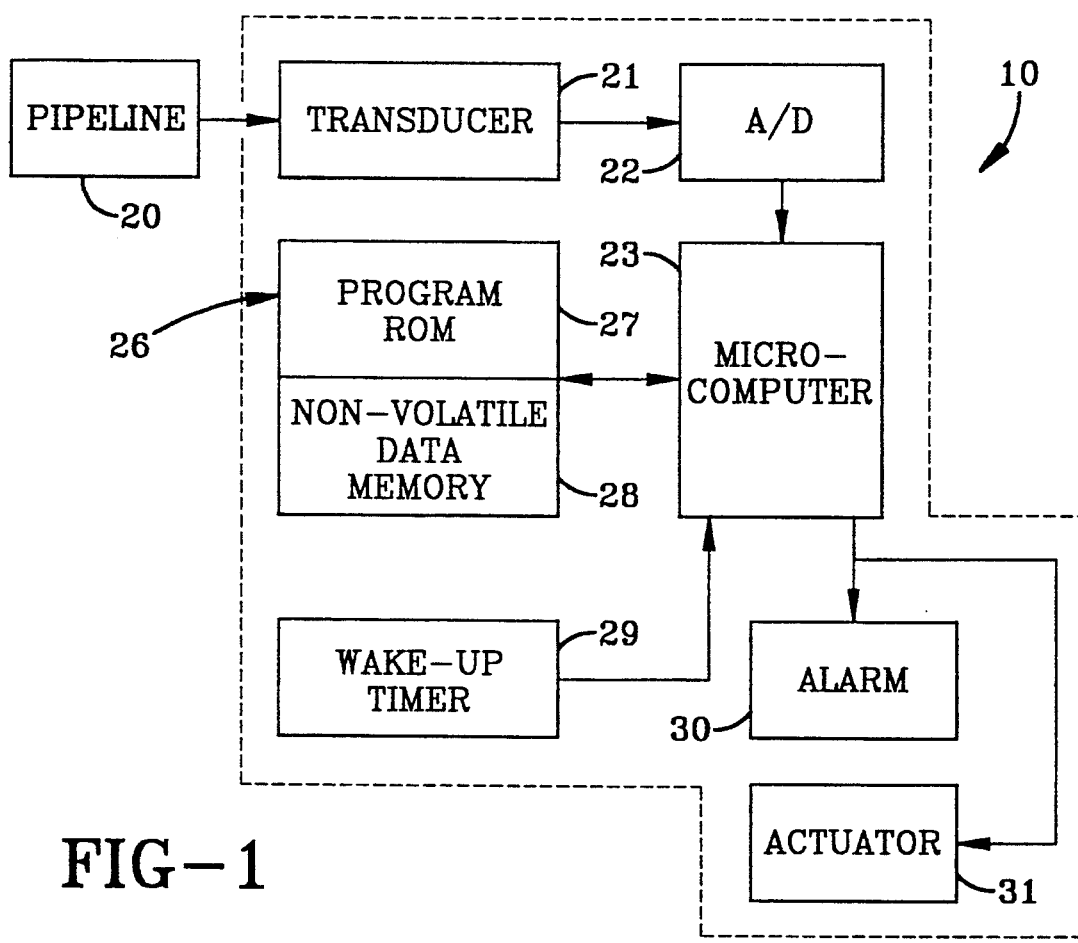
FIG. 1 is a block diagram of an exemplary device in accordance with the concept of the present invention for use with a pressurized fluid vessel such as a pipeline.

FIG. 1 depicts a device, generally indicated by the numeral 10, and performs a method for detecting unacceptable operational conditions (also called irregular operation) in a pressurized fluid vessel such as a pipeline 20. Device 10 includes a transducer 21, a signal conditioner and analog-to-digital (A/D) converter 22, a microcomputer 23, memory 26 such as program ROM 27 and non-volatile data memory 28, wake-up timer 29, alarm 30, and where desired, a system shut-down actuator such as valve shut-off actuator 31.

Transducer 21 may be any measuring instrument capable of withstanding the environmental rigors of pipeline 20, monitoring the instantaneous pipeline characteristic responsive to leaks and breaks of interest (in the preferred embodiment, instantaneous pressure), and generating a proportional electrical output signal. The pressure signal is received by A/D converter 22, which digitizes and samples as appropriate for the application and as requested by microcomputer 23. In the present example it has been found sufficient and optimal to collect and store pressure magnitude at every eight seconds for eight intervals of time. This yields the nine instantaneous pressure data points, identified as $P_A$ through $P_I$, in FIG. 2, collected over a sixty-four second period of time.

Microcomputer 23 may be any processor capable of performing the necessary operation described in further detail hereinafter. However, inasmuch as power is commonly limited at the remote pipeline 20 sites where device 10 is installed, it is preferable for this processor to include a so-called idle and powerdown feature and on-board memory and I/O to conserve energy consumption and reduce component count and expense. The Model 80C31 CHMOS Single-Chip 8-bit Microcomputer commercially available from Intel Corporation of Santa Clara, Calif. has been found to be suitable for inclusion as microcomputer 23. Supporting microcomputer 23 is memory 26 having conventional program ROM 27 and non-volatile data memory 28, and a wake-up timer 29 that actuates microcomputer 23 at preselected intervals for performance of its programmed functions.

Microcomputer 23 generates an appropriate alarm signal to alarm 30, and optionally to actuator 31 upon the occurrence of an unacceptable operation condition as noted further hereinafter. Alarm 30, which may be visual and/or audible, and actuator 31 are further described in U.S. Pat. No. 4,012,944.

Figure 2:
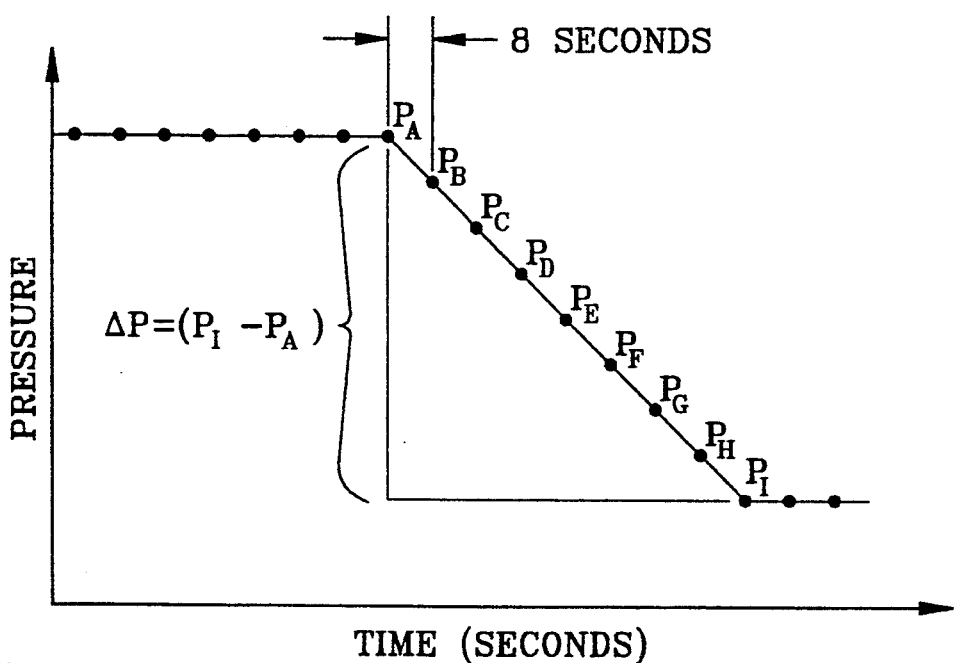
FIG. 2 is a plot of exemplary pressure magnitude as a function of time within a typical pipeline. Nine instantaneous pressure data points, identified as $P_A$ through $P_I$, present pressure after eight equal duration preselected time intervals, such as eight seconds each. However, as illustrated, both pressure and time are relative and not intended to be drawn to a specific scale.
Figure 3:
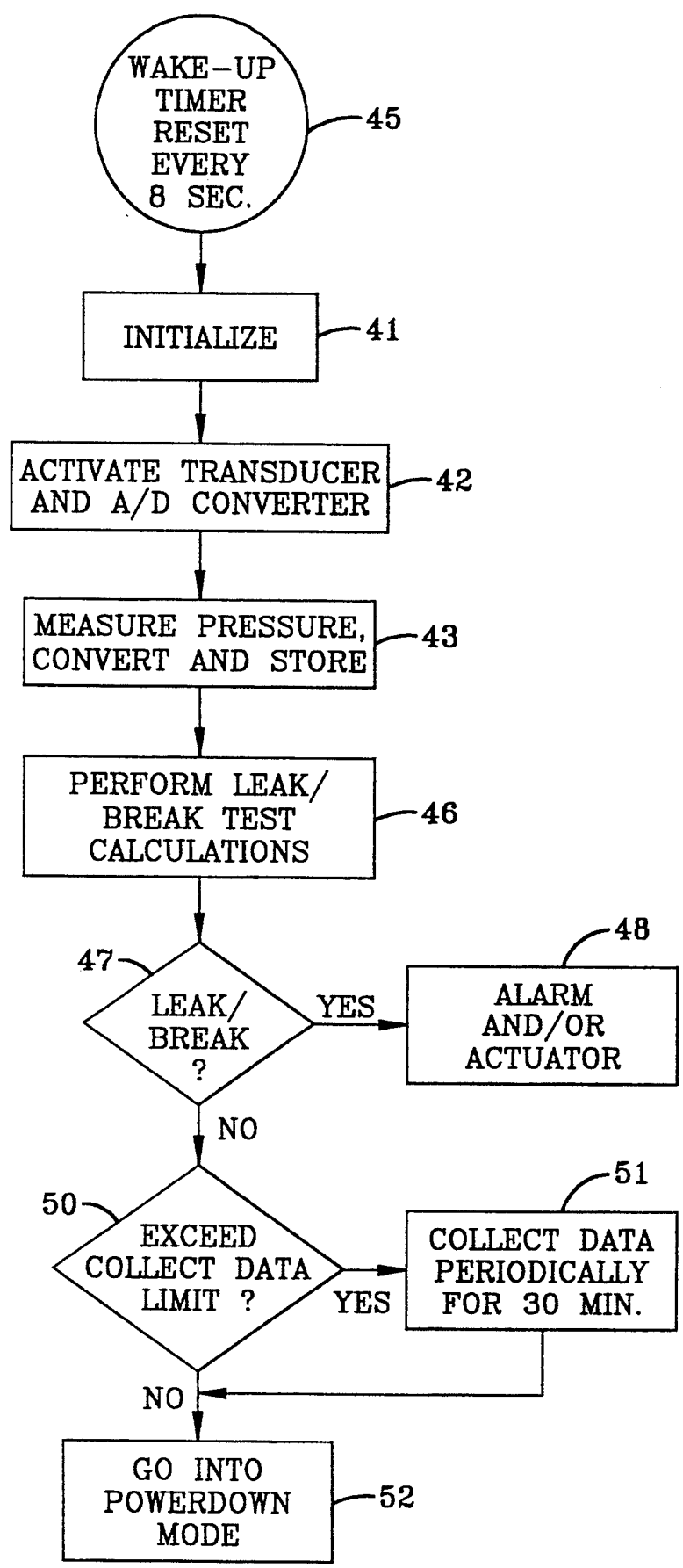
FIG. 3 is a top level flow chart of the operation of the device and particularly, the microcomputer.

Operation of device 10 may be most readily understood by reference to the exemplary graph of pressure with time shown in FIG. 2, and the flow-chart of FIG. 3. Microcomputer 23 performs a plurality of distinctly different tests upon the collected pressure data to reliably ascertain if a leak or break in pipeline 20 has occurred. The first test, which may be referred to as timed interval comparisons, involves a comparison of rates of change of pressure at successive preselected timed intervals (called preselected measurement time intervals).

The timed interval comparisons test begins by calculating the timed interval pressure changes throughout a preselected study time interval. Faulty results may be minimized by considering the timed interval to be more than one data sample period. Thus, in the present example, it is advantageous to pair every fourth pressure measurement and calculate the following timed interval pressure changes: $P_E - P_A$, $P_F - P_B$, $P_G - P_C$, $P_H - P_D$ and $P_I - P_E$. The total change in pressure, $P_I - P_A$, is also calculated. Each of the timed interval pressure changes are compared to a preselected maximum rate of pressure change (dP/dt(max)), and the total change in pressure is compared to a preselected maximum total change in pressure. If each of the timed interval pressure changes exceed the preselected maximum rate of pressure change (dP/dt(max)), and the total change in pressure exceeds the preselected maximum total change in pressure for longer than a first preselected period of time ($T_1$), microcomputer 23 actuates alarm 30 and/or actuator 31 as previously noted.

Microcomputer 23 may, and preferably does, also perform other calculations and tests upon the collected pressure data. For example, the average pressure throughout the timed intervals can be summed and averaged (e.g., $(P_F+P_G+P_H+P_I/4)$, and compared to both preselected maximum and minimum pressure changes. If the average pressure change exceeds the preselected maximum pressure change for longer than a preselected period of time ($T_2$), or the average pressure change is less than the preselected minimum pressure change for longer than a preselected period of time ($T_3$), microcomputer 23 may actuate alarm 30 and/or actuator 31 as previously noted. Tests such as these are described more fully in U.S. Pat. No. 4,012,944, which is hereby incorporated by reference.

Turning to the flow chart presented in FIG. 3, operation of device 10 can be seen to begin in stop 40 with reset of microcomputer 23 by wake-up timer at the preselected time intervals (here, every eight seconds). Thereafter microcomputer 23 performs in step 41 any necessary or desired initialization as would be known to the ordinarily skilled artisan, activates in step 42 transducer 21 and A/D converter 22, and initiates measurement in step 43 by transducer 21 of instantaneous pressure in pipeline 20. Next microcomputer 23 performs in step 46 the test calculations described hereinbefore, performs in step 47 the previously noted comparisons to ascertain if there exists a leak or break, and, if so, activates in step 48 alarm 30 and/or actuator 31.

It has been found helpful in monitoring pipeline performance and selecting optimal threshold values to record pressure data for later study for a limited period of time such as 30 minutes, every time the instantaneous pressure or change in pressure exceeds some preselected limits that are not as great as those indicative of a break or leak condition. To this end, microcomputer 30 may perform in step 50 whatever further comparisons are desired to conclude whether data should be logged, and if those comparisons are positive, collect data in step 51 for the preselected period of time. If the data collection limits are not exceeded, and optionally but desirably between collection of data during the study interval, microcomputer 52 goes into its so-called powerdown mode as shown in step 52.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed and method performed according to the concept of the present invention, and reasonably equivalent thereto, will accomplish the objects of the present invention and otherwise substantially improve the art of detection of unacceptable operation conditions in pressurized fluid vessels.

I claim:

1. A device for monitoring and detecting irregularities in a preselected characteristic of a fluid in a vessel, comprising:

transducer means for monitoring the preselected characteristic of the fluid in the vessel and providing an analog transducer output signal proportional thereto;

converter means for receiving said analog transducer output signal, sampling said analog transducer output signal at preselected measurement time intervals within a preselected study time interval, and providing a digital output signal proportional to said analog transducer output signal at each said preselected measurement time interval;

processor means for receiving said digital output signal for each said preselected measurement time interval, calculating a plurality of changes in the preselected characteristic for a like plurality of said preselected measurement time intervals, calculating a total change in the preselected characteristic over said preselected study time interval, comparing said plurality of changes in the preselected characteristic to a preselected maximum rate of change in the preselected characteristic, comparing said total change in the preselected characteristic over said preselected study time interval to a preselected maximum total change in the preselected characteristic, and generating an alarm output signal when a preselected plurality of said plurality of changes in the preselected characteristic exceed said preselected maximum rate of change in the preselected characteristic and said total change in the preselected characteristic over said preselected study time interval exceeds said preselected maximum total change in the preselected characteristic for longer than a first preselected period of time; and, alarm means receiving said alarm output signal and annunciating the existence of an irregularity in the preselected characteristic.

2. A device, as set forth in claim 1, wherein said processor means further includes means for calculating the average value of the preselected characteristic for each said preselected measurement time interval over said preselected study time interval, comparing said average value to a preselected maximum value of the preselected characteristic and a preselected minimum value of the preselected characteristic, and generating said alarm output signal when said average value exceeds at least one of said preselected maximum value and said preselected minimum value.

3. A device, as set forth in claim 2, wherein said processor means further includes means for limiting power consumption during periods between processing intervals, and further including wake-up timer means for periodically initiating resumption of processor processing at said preselected measurement time intervals within said preselected study time interval.

4. A device, as set forth in claim 3, wherein the preselected characteristic is pressure, the vessel is a pipeline, and said transducer means monitors pressure.

5. A device, as set forth in claim 3, wherein said alarm means includes means for actuating corrective action to at least minimize the effects of the irregularity in the preselected characteristic.

6. A method for monitoring and detecting irregularities in a preselected characteristic of a fluid in a vessel, comprising the steps of:

monitoring the preselected characteristic of the fluid in the vessel and providing an analog transducer output signal proportional thereto;

sampling said analog transducer output signal at preselected measurement time intervals within a preselected study time interval and providing a digital output signal proportional to said analog transducer output signal at each preselected measurement time interval;

calculating a plurality of changes in the preselected characteristic for a like plurality of said preselected measurement time intervals;

calculating a total change in the preselected characteristic over said preselected study time interval;

comparing said plurality of changes in the preselected characteristic to a preselected maximum rate of change in the preselected characteristic;

comparing said total change in the preselected characteristic over said preselected study time interval to a preselected maximum total change in the preselected characteristic;

generating an alarm output signal when a preselected plurality of said plurality of changes in the preselected characteristic exceed said preselected maximum rate of change in the preselected characteristic and said total change in the preselected characteristic over said preselected study time interval exceeds said preselected maximum total change in the preselected characteristic for longer than a first preselected period of time; and, annunciating the existence of an irregularity in the preselected characteristic.

7. A method, as set forth in claim 6, further including the steps of calculating the average value of the preselected characteristic for each said preselected measurement time interval over said preselected study time interval, comparing said average value to a preselected maximum value of the preselected characteristic and a preselected minimum value of the preselected characteristic, and generating said alarm output signal when said average value exceeds at least one of said preselected maximum value and said preselected minimum value.

8. A method, as set forth in claim 7, wherein said steps of calculating a plurality of changes, calculating a total change, comparing said plurality of changes, comparing said total change, and generating an alarm output signal all occur in a processor having a powerdown operation mode for limiting power consumption during periods between processing intervals, and further including the step of periodically initiating resumption of processor processing at said preselected measurement time intervals within said preselected study time interval.

9. A method, as set forth in claim 8, wherein said step of monitoring a preselected characteristic includes the step of monitoring pressure in a pipeline.

10. A method, as set forth in claim 9, further including the step of actuating corrective action to at least minimize the effects of the irregularity in the preselected characteristic.

* * * * *